(12) United States Patent
Persky

(10) Patent No.: US 7,229,015 B2
(45) Date of Patent: Jun. 12, 2007

(54) SELF-CHECKOUT SYSTEM

(75) Inventor: Michael B. Persky, New Canaan, CT (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 11/025,784

(22) Filed: Dec. 28, 2004

(65) Prior Publication Data
US 2006/0138220 A1   Jun. 29, 2006

(51) Int. Cl.
*G06K 15/00* (2006.01)
(52) U.S. Cl. .......................... 235/383; 186/61; 705/16
(58) Field of Classification Search ................ 235/383; 186/60, 61, 62; 705/16
See application file for complete search history.

(56) References Cited

U.S. PATENT DOCUMENTS

| | | | | |
|---|---|---|---|---|
| 5,252,814 A | * | 10/1993 | Tooley | ........................ 235/383 |
| 5,426,282 A | * | 6/1995 | Humble | ...................... 235/383 |
| 5,497,314 A | * | 3/1996 | Novak | .......................... 705/17 |
| 5,540,301 A | | 7/1996 | Dumont | |
| 5,543,607 A | * | 8/1996 | Watanabe et al. | ........... 235/383 |
| 5,641,039 A | * | 6/1997 | Dumont | ........................ 186/61 |
| 5,774,053 A | * | 6/1998 | Porter | ..................... 340/568.1 |
| 5,992,570 A | | 11/1999 | Walter et al. | |
| 6,092,725 A | | 7/2000 | Swartz et al. | |
| 6,169,483 B1 | | 1/2001 | Ghaffari et al. | |
| 6,550,582 B2 | * | 4/2003 | Addy et al. | .................... 186/61 |
| 6,571,218 B1 | | 5/2003 | Sadler | |
| 6,598,790 B1 | * | 7/2003 | Horst | ......................... 235/383 |
| 6,672,506 B2 | | 1/2004 | Swartz et al. | |
| 6,862,576 B1 | * | 3/2005 | Turner et al. | ................. 705/26 |
| 7,000,833 B2 | * | 2/2006 | Sato | ........................... 235/383 |
| 7,036,726 B1 | * | 5/2006 | Edwards | ..................... 235/383 |
| 7,044,370 B2 | * | 5/2006 | Bellis et al. | ................ 235/383 |
| 7,114,656 B1 | * | 10/2006 | Garver | .................. 235/462.46 |
| 2003/0001007 A1 | | 1/2003 | Lee et al. | |
| 2003/0195818 A1 | | 10/2003 | Howell et al. | |
| 2004/0041021 A1 | * | 3/2004 | Nugent, Jr. | ................. 235/383 |

\* cited by examiner

*Primary Examiner*—Ahshik Kim
(74) *Attorney, Agent, or Firm*—Sawyer Law Group LLP

(57) ABSTRACT

A system and method for providing a self-checkout system. The self-checkout system includes a processor and a first device coupled to the processor, where the first device identifies an item. The self-checkout system also includes a first receptacle coupled to the first device. The first receptacle receives the item after being identified by the first device. The self-checkout system also includes a second device coupled to the first receptacle. The second device identifies the item after being received by the first receptacle, and the processor verifies if the item identified by the second device is the same item identified by the first device. As a result, the checkout process is reliable and secure.

30 Claims, 3 Drawing Sheets ized by the scanner 54 reads. The barcode corresponds to a price, which appears on the monitor and tender station 52 for the user's 60 viewing. After scanning the item 62, the user 60 immediately places the item 62 in a bag 64, which lays on top of the weighing scale 56.

SELF-CHECKOUT SYSTEM

FIELD OF THE INVENTION

The present invention relates to checkout stations, and more particularly to a system and method for providing a self-checkout station.

BACKGROUND OF THE INVENTION

Checkout stations are well known, and are typically used in retail businesses to assist customers in purchasing products. Self-checkout stations have been introduced to provide customers with a self-serve alternative to the conventional operator-run checkout station. Self-checkout stations also reduce a business' operating costs, because the self-checkout station ideally eliminates the need for an operator to operate the checkout station.

In some conventional self-checkout stations, the customer typically handles all of the items to be purchased. As such, the customer personally performs barcode scanning and product code entry.

In the world of retail self checkout, one of the key concerns is how does the retailer ensures that the items scanned and paid for by the customer are actually the items that are carried off by the customer. This problem is particularly difficult when many of the items in a store are similar in shape, size, weight, or "look and feel." This problem is particularly relevant in retail establishments that sell or rent books, tapes, DVDs, CDs, videos, video game cartridges, and other items that are difficult to distinguish on the basis of shape, size, and weight.

FIG. 1 is a block diagram showing a side-view of a conventional self-checkout station 50, which includes a monitor and tender station 52, a scanner 54, and a weighing scale 56. In operation, the customer 60 scans an item 62 with the scanner 54. The item typically has an attached barcode, preferably a universal product code (UPC), that the scanner 54 reads. The barcode corresponds to a price, which appears on the monitor and tender station 52 for the user's 60 viewing. After scanning the item 62, the user 60 immediately places the item 62 in a bag 64, which lays on top of the weighing scale 56.

To verify if the item placed on the scale 56 is the same item 62 that was just scanned, the weighing scale 56 weighs the item just placed in the bag and compares the weight of the item placed in the bag 64 to an expected weight associated with the barcode of the scanned item 62. If the weight values match, the item in the bag is assumed to be the item 62. Once the item 62 is scanned, the customer 60 then pays for them using the monitor and tender station 52. The problem with this conventional solution is that it does not work well for items having the same weight (e.g. books, videos, DVDs, CDs) but having substantially different prices.

Another conventional solution uses a height detector to verify the dimensions of the item. The height detector uses an infrared sensor to measure the height of an item in any orientation, and this height is then compared to an expected height associated with the barcode of the scanned item 62. The problem with this conventional solution is that it also does not work well for items having the same dimensions (e.g. books, videos, DVDs, CDs), but having substantially different prices.

In another conventional solution, items after being scanned are routed on a conveyer to a receiving area where the items can be bagged. The additional security is provided by the fact that the item is actually on display as it moves down the conveyor. Also, there is a physical distance separating the two actions of scanning and bagging. This conventional solution is problematic for similar reasons as those described above where items are similar in shape, size, and weight.

Another conventional solution uses a real time video camera to monitor transactions. The problem with this conventional solution is that it requires someone to be present and observe at all times, and is therefore costly since a staff person needs to be hired to monitor the transactions.

Generally, there is not a good solution to this problem today in that the conventional solutions require the maintenance of a security database, which contains item UPCs cross-referenced with item-specific weights and dimensions. Also, conventional solutions also do not address problems associated with items having similar shape, size, and weight.

Accordingly, what is needed is an improved and more secure self-checkout system. The system and method should be able to address problems associated with items having similar shape, size, and weight, and should be simple, cost effective, and capable of being easily adapted to existing technology. The present invention addresses such a need.

SUMMARY OF THE INVENTION

A self-checkout system is disclosed. The self-checkout system includes a processor and a first device coupled to the processor, where the first device identifies an item. The self-checkout system also includes a first receptacle coupled to the first device. The first receptacle receives the item after being identified by the first device. The self-checkout system also includes a second device coupled to the first receptacle. The second device identifies the item after being received by the first receptacle, and the processor verifies if the item identified by the second device is the same item identified by the first device. As a result, the checkout process is reliable and secure.

DETAILED DESCRIPTION OF THE INVENTION

The present invention relates to checkout stations, and more particularly to a system and method for providing a self-checkout station. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A system and method in accordance with the present invention for processing one or more items at a self-checkout system are disclosed. A customer manually scans an item using a scanner and then inserts the item into a slot of a verification receptacle. A second scanner inside of the verification receptacle automatically scans the item to verify if it is the same item that was scanned by the customer. If so, the item is routed into a collection receptacle having a locked door, which is unlocked after the customer pays for the item. As a result, the self-checkout process is made more secure. To more particularly describe the features of the present invention, refer now to the following description in conjunction with the accompanying figures.

Figure 1:
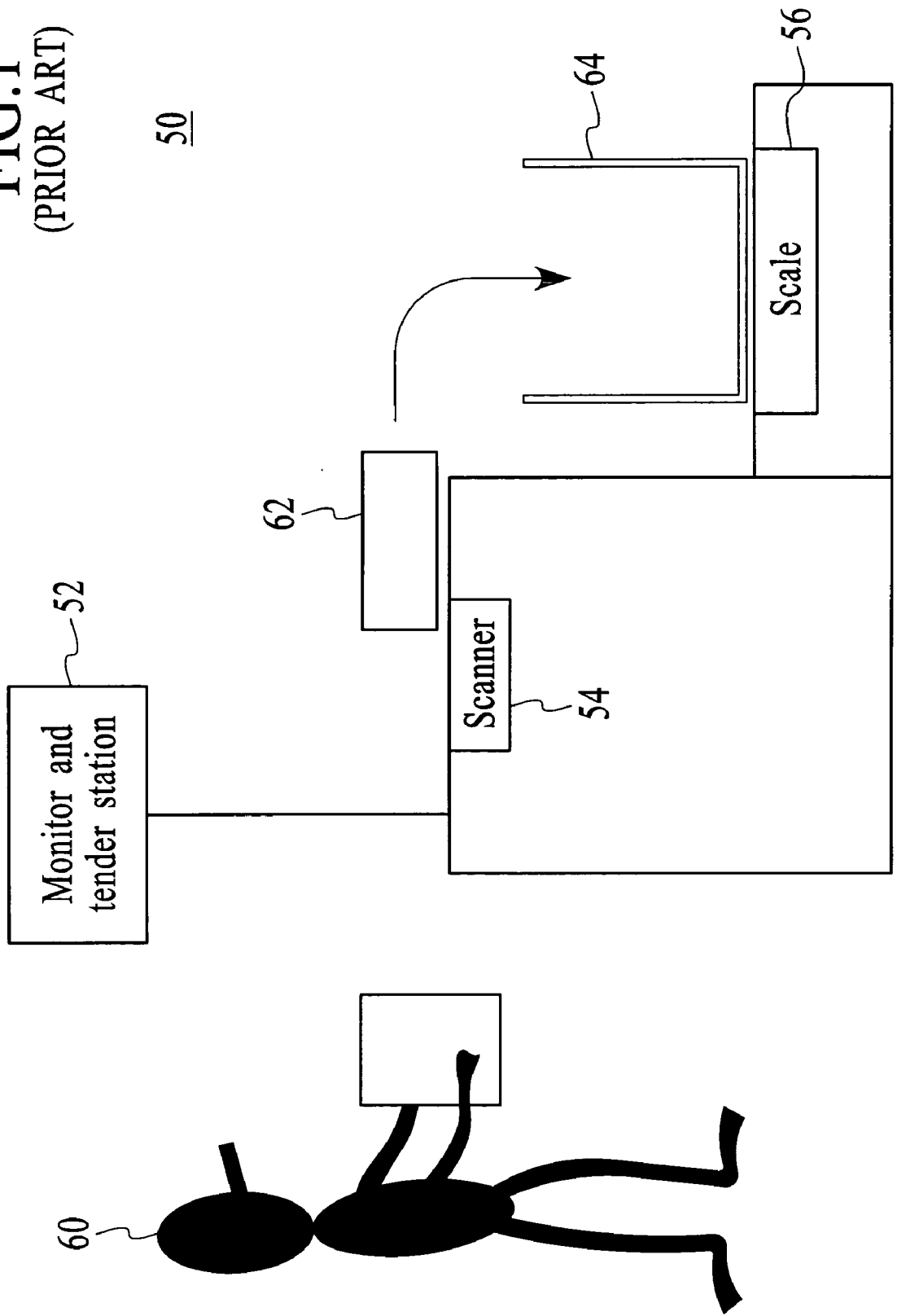
FIG. 1 is a block diagram showing a side-view of a conventional self-checkout station.
Figure 2:
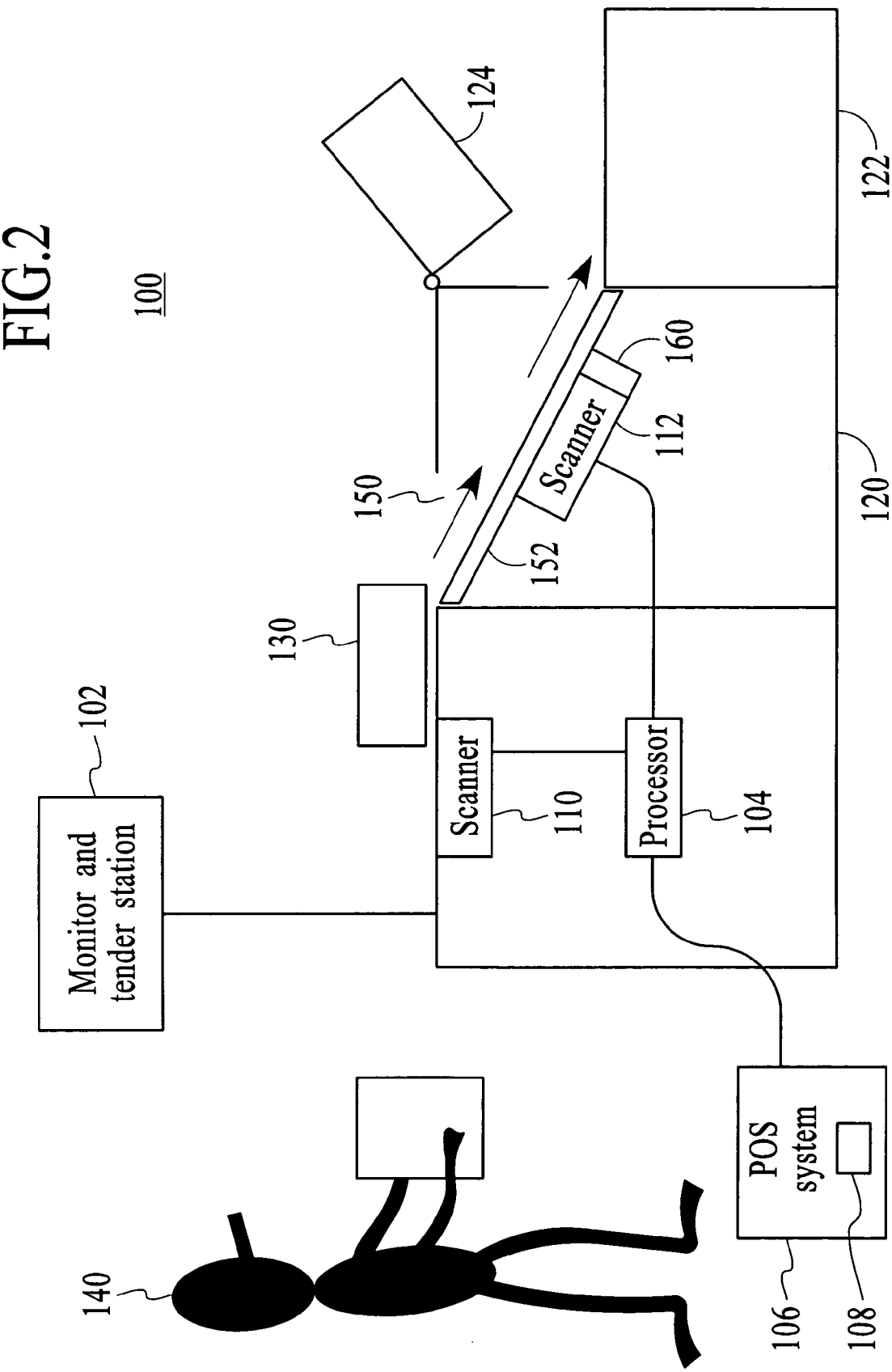
FIG. 2 is a block diagram showing a side-view of a self-checkout system in accordance with the present invention.
Figure 3:
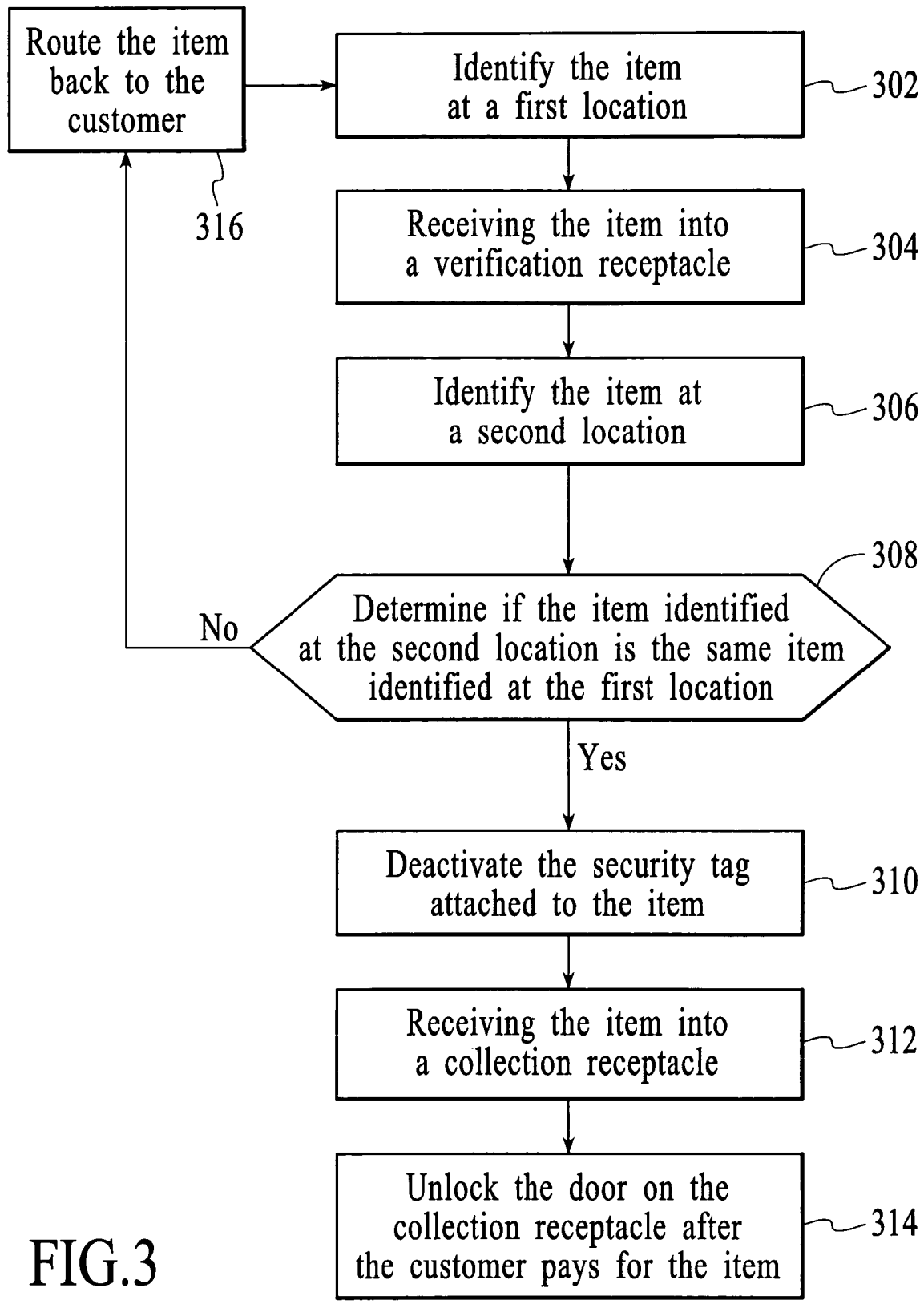
FIG. 3 is a flow chart showing a method for processing items at a self-checkout station in accordance with the present invention.

FIG. 2 is a block diagram showing a side-view of a self-checkout system 100 in accordance with the present invention. The self-checkout system 100 includes a monitor and tender station 102, a processor 104, a point of sale (POS) system 106, scanners 110 and 112, a verification receptacle 120, and a collection receptacle 122, which has a lockable lid 124. FIG. 3 is a flow chart showing a method for processing items at a self-checkout station in accordance with the present invention. Referring to FIGS. 2 and 3 together, first, an item 130 is identified utilizing the scanner 110, which is manually operated by a customer 140 at a first location, in a step 302. The item 130 can be a CD, a book, a video, a DVD, etc., or any other item to be purchased. The self-checkout system 100 is coupled to the POS system 106 via an in-store network. The POS system 106 contains a database 108 that stores item descriptions and prices. Accordingly, when the scanner 110 scans the item 130, the scanner 110 reads a barcode on the item 120, preferably a UPC. The scanner 110 is a fixed scanner, or can alternatively be a hand held scanner.

Once scanned, the appropriate item description, price, and running price total are displayed on the monitor and tender station 102 for the user's 140 viewing. The self-check system 100 can also provide audio feedback in addition to visual feedback to the customer 140.

Next, the item 130 is received into the verification receptacle 120 as the customer 140 inserts the item 130 into a slot 150 of the verification receptacle 120, in a step 304. The item 130 is placed onto a conveyor 152, or alternatively a ramp. The conveyor 152 carries the item 130 to the scanner 112. Next, the item 130 is identified by the scanner 112 at a second location (i.e. inside the verification receptacle), in a step 306. The verification receptacle 120 is enclosed such that the item 130 is inaccessible to the customer 140 after the item 130 is inserted into the slot 150. The second scan or "verification scan" is an automatic operation and is performed inside the verification receptacle 120 so that the customer 140 cannot interfere with the second scan. For additional verification, the scanner 112 can be used in combination with other conventional verification devices such as a weighing scale, height detector, etc.

Next, in a step 308, the processor 104 determines if the item identified at the second location is the same item 130 identified at the first location. If the item identified at the second location is the same item 130 identified at the first location, a security tag (e.g. electronic article surveillance tag) attached to the item 130 is deactivated, in a step 310. In a specific embodiment, an electronic article surveillance deactivator 160 is used to deactivate the security tag.

Although the present invention is described in the context of UPC scanners, one of ordinary skill in the art recognizes that other types of identification devices, such as radio frequency identification (RFID) readers, image recognition devices, etc., can be used to identify the item, and their use would be within the spirit and scope of the present invention.

Next, the item 130 is received into the collection receptacle 122, if the item identified at the second location is the same item 130 identified at the first location, in a step 312. The customer 140 can then pay for the item 130. The self-check system 100 accepts all payment types of tender (cash, credit, debit, check, etc.). Next, the lid 124 on the collection receptacle 122 is automatically unlocked after the customer 140 pays for the item 130, in step 314. The customer 140 can then open the lid 124, retrieve the item, and leave the store. Once the customer 140 pays, the slot 150 is preferably blocked so that no further items can be deposited.

Although the present invention is described in the context of the lid 130, one of ordinary skill in the art recognizes that other types of doors can be used to secure and release the item, and their use would be within the spirit and scope of the present invention.

If the item identified at the second location is not the same item 130 identified at the first location, the item 130 is returned to the customer 140, in a step 316. As such, the conveyor 152 is reversed to push the item 130 back up the slot 150. Alternatively, a mechanical arm can push the item 130 back up the slot 150. The customer 140 can then try scanning the item 130 again with the scanner 110, in step 302.

According to the system and method disclosed herein, the present invention provides numerous benefits. For example, it provides secured transactions by ensuring that items taken out of a store by a customer are the same items scanned (i.e. paid for) by the customer. The self-checkout system is especially value in purchases involving items of similar shapes, sizes, and weights, such as books, videos, CDs, DVDs.

A system and method for processing one or more items at a self-checkout system are disclosed. A customer manually scans an item using a scanner and then inserts the item into a slot of a verification receptacle. A second scanner inside of the verification receptacle automatically scans the item to verify if it is the same item that was scanned by the customer. If so, the item is routed into a collection receptacle having a locked door, which is unlocked after the customer pays for the item. As a result, the self-checkout process is made more secure.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A self-checkout system comprising:
   a processor;
   a first device coupled to the processor, wherein the first device identifies an item;
   a first receptacle coupled to the first device, wherein the item is inserted into the first receptacle after being identified by the first device, wherein the first receptacle is enclosed such that the item is inaccessible to a customer after the item is inserted into the first receptacle; and a second device coupled to the first receptacle, wherein the second device identifies the item after being received by the first receptacle, wherein the processor verifies if the item identified by the second device is the same item identified by the first device.

2. The system of claim 1 further comprising a second receptacle coupled to the first receptacle, wherein the second receptacle receives the item if the item identified by the second device is the same item identified by the first device.

3. The system of claim 2 wherein the item can be retrieved from the second receptacle after the item has been paid for.

4. The system of claim 2 wherein the second receptacle comprises a lockable door, wherein the door is unlocked after the item has been paid for.

5. The system of claim 1 further comprising a conveyor coupled to the first receptacle, wherein the conveyor routes the item back to a user if the item identified by the second device is not the same item identified by the first device.

6. The system of claim 1 further comprising a third device coupled to the first receptacle, wherein the third device deactivates a security tag attached to the item if the item identified by the second device is the same item identified by the first device.

7. The system of claim 1 wherein the first and second devices are scanners.

8. The system of claim 1 wherein the first device is manually operated by a user.

9. The system of claim 1 Wherein the second device is automated.

10. The system of claim 1 wherein the first receptacle is enclosed such that the item is not accessible by a user while the item is inside the receptacle.

11. A self-checkout system comprising:
a processor;
a first device coupled to the processor, wherein the first device identifies an item, wherein the first device is manually operated by a user;
a first receptacle coupled to the first device, wherein the item is inserted into the first receptacle after being identified by the first device, wherein the first receptacle is enclosed such that the item is inaccessible to a customer after the item is inserted into the first receptacle;
a second device coupled to the first receptacle, wherein the second device identifies the item after being received by the first receptacle, wherein the second device is automated, wherein the processor verifies if the item identified by the second device is the same item identified by the first device; and
a second receptacle coupled to the first receptacle, wherein the second receptacle receives the item if the item identified by the second device is the same item identified by the first device.

12. The system of claim 11 wherein the item can be retrieved from the second receptacle after the item has been paid for.

13. The system of claim 11 wherein the second receptacle comprises a lockable door, wherein the door is unlocked after the item has been paid for.

14. The system of claim 11 further comprising a conveyor coupled to the first receptacle, wherein the conveyor routes the item back to a user if the item identified by the second device is not the same item identified by the first device.

15. The system of claim 11 further comprising a third device coupled to the first receptacle, wherein the third device deactivates a security tag attached to the item if the item identified by the second device is the same item identified by the first device.

16. The system of claim 11 wherein the first and second devices are scanners.

17. The system of claim 11 wherein the first receptacle is enclosed such that the item is not accessible by a user while the item is inside the receptacle.

18. A self-checkout system comprising:
a processor;
a first device coupled to the processor, wherein the first device identifies an item, wherein the first device is manually operated by a user;
a first receptacle coupled to the first device, wherein the item is inserted into the first receptacle after being identified by the first device, wherein the first receptacle is enclosed such that the item is inaccessible to a customer after the item is inserted into the first receptacle;
a second device coupled to the first receptacle, wherein the second device identifies the item after being received by the first receptacle, wherein the second device is automated, wherein the processor verifies if the item identified by the second device is the same item identified by the first device;
a second receptacle coupled to the first receptacle, wherein the second receptacle receives the item if the item identified by the second device is the same item identified by the first device, and wherein the second receptacle comprises a lockable door, wherein the door is unlocked after the item has been paid for;
a conveyor coupled to the first receptacle, wherein the conveyor routes the item back to the user if the item identified by the second device is not the same item identified by the first device; and
a third device coupled to the first receptacle, wherein the third device deactivates a security tag attached to the item if the item identified by the second device is the same item identified by the first device.

19. A method for checking out an item, the method comprising:
identifying the item at a first location;
receiving the item into a first receptacle after the item is identified at the first location, wherein the first receptacle is enclosed such that the item is inaccessible to a customer after the item is inserted into the first receptacle;
identifying the item at a second location; and
verifying if the item identified at the second location is the same item identified at the first location.

20. The method of claim 19 further comprising receiving the item at a third location if the item identified at the second location is the same item identified at the first location.

21. The method of claim 19 further comprising:
providing a receptacle; and
receiving the item in the receptacle if the item identified at the second location is the same item identified at the first location.

22. The method of claim 21 further comprising:
providing a lockable door on the receptacle; and
unlocking the door after the item has been paid for.

23. The method of claim 19 further comprising routing the item back to a user if the item identified at the second location is not the same item identified at the first location.

24. The method of claim 19 further comprising deactivating a security tag attached to the item if the item identified at the second location is the same item identified at the first location.

25. A computer readable medium containing program instructions for checking out an item, the program instructions which when executed by a computer system cause the computer system to execute a method comprising:

identifying the item at a first location;

receiving the item into a first receptacle after the item is identified at the first location, wherein the first receptacle is enclosed such that the item is inaccessible to a customer after the item is inserted into the first receptacle;

identifying the item at a second location; and verifying if the item identified at the second location is the same item identified at the first location.

26. The computer readable medium of claim 25 further comprising program instructions for receiving the item at a third location if the item identified at the second location is the same item identified at the first location.

27. The computer readable medium of claim 25 further comprising program instructions for receiving the item in a receptacle if the item identified at the second location is the same item identified at the first location.

28. The computer readable medium of claim 25 further comprising:

program instructions for receiving the item in a receptacle if the item identified at the second location is the same item identified at the first location, wherein the receptacle has a lockable door; and program instructions for unlocking the door after the item has been paid for.

29. The computer readable medium of claim 25 further comprising program instructions for routing the item back to a user if the item identified at the second location is not the same item identified at the first location.

30. The computer readable medium of claim 25 further comprising program instructions for deactivating a security tag attached to the item if the item identified at the second location is the same item identified at the first location.

* * * * *